Oct. 22, 1940.   P. KOLLSMAN   2,219,243
GYROSCOPIC INSTRUMENT
Original Filed May 17, 1937   2 Sheets-Sheet 1
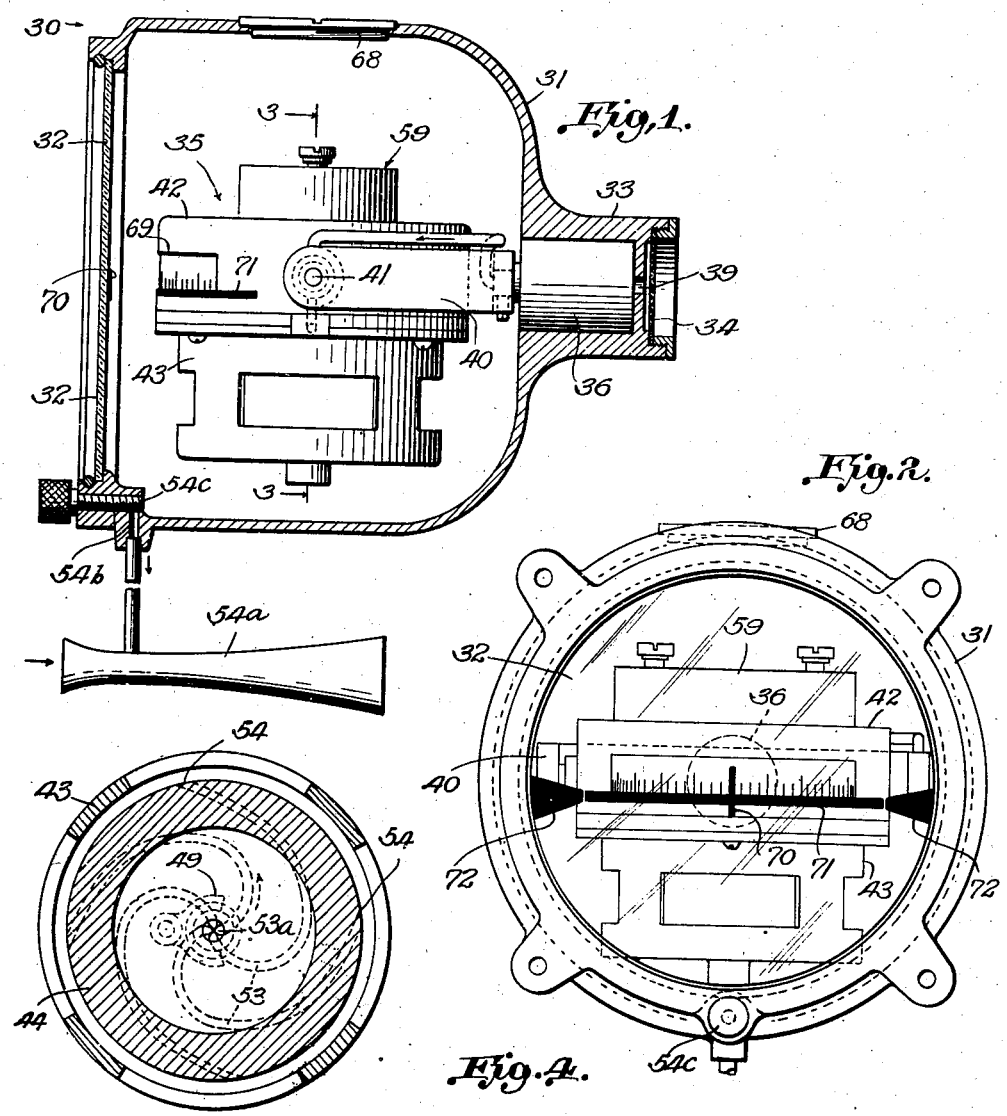

Oct. 22, 1940.  P. KOLLSMAN  2,219,243
GYROSCOPIC INSTRUMENT
Original Filed May 17, 1937  2 Sheets-Sheet 2
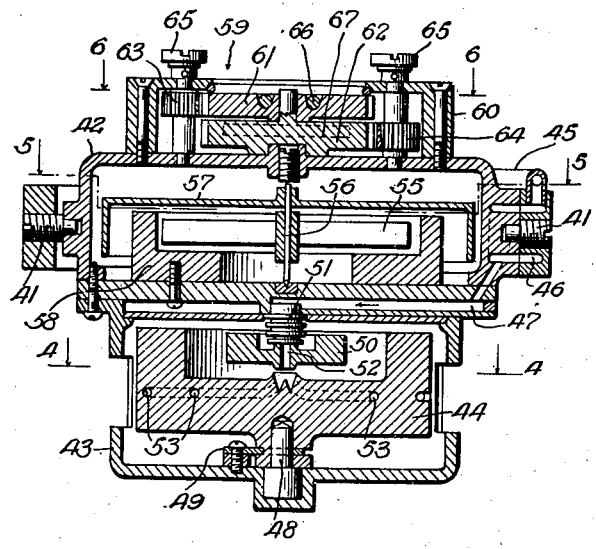
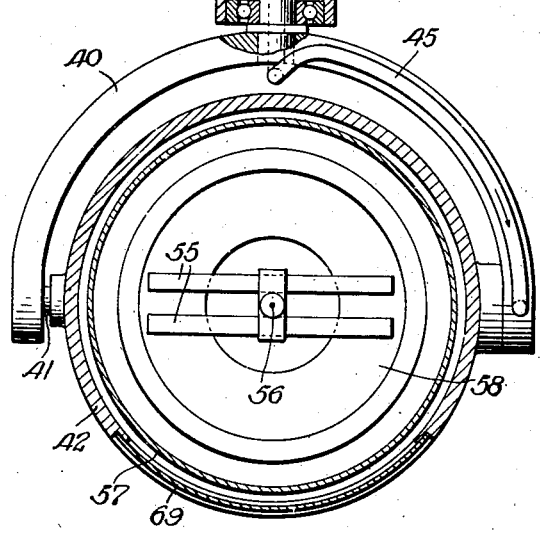
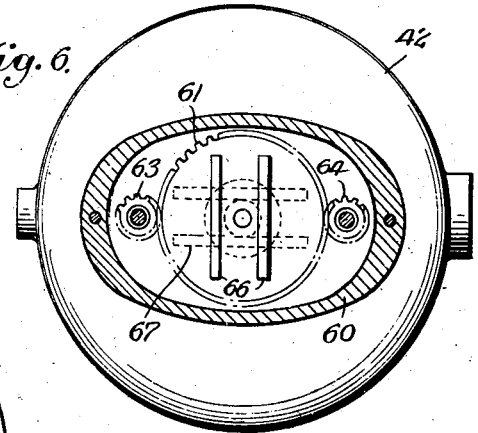
Inventor
Paul Kollsman
By Gunter Rathke
his Attorney Patented Oct. 22, 1940

2,219,243

UNITED STATES PATENT OFFICE 2,219,243

GYROSCOPIC INSTRUMENT

Paul Kollsman, New York, N. Y.

Original application May 17, 1937, Serial No. 143,241. Divided and this application June 8, 1939, Serial No. 277,997

14 Claims. (Cl. 74—5)

The present invention relates to gyroscopic apparatus.

This application is a division of my co-pending application, Serial No. 143,241, filed May 17, 1937, the latter application being a division of my application Serial No. 603,432, filed April 5, 1932 now Patent 2,080,490.

It is an object of this invention to provide an improved damped gyroscopic device.

It is a further object of this invention to provide in a gyroscopic device improved means for preventing tilting of the gyroscope rotor out of a predetermined normal position.

Further aims, objects and advantages of this invention will appear from a consideration of the description which follows and the accompanying drawings showing for purely illustrative purposes an embodiment of this invention. It is to be understood, however, that the description is not to be taken in a limiting sense, the scope of this invention being defined in the appended claims.

Referring to the drawings:

Fig. 1 is a view of a device embodying the invention with parts in elevation and other parts in vertical section;

Fig. 2 is a view in front elevation thereof with a part removed;

Fig. 3 is a view in vertical section taken on line 3—3 of Fig. 1;

Figs. 4, 5 and 6 are views in horizontal section taken on line 4—4, 5—5, and 6—6, respectively, of Fig. 3.

In the drawings, the present invention is shown as applied to an improved stabilized device which is responsive to the earth's magnetic field. The device may include a magnetic north seeking element stabilized by a gyroscope.

Referring in detail to the drawings, 30 denotes a device embodying the invention. The same may include a mounting such as a casing 31 supported in any suitable manner. This casing may be wholly closed, if desired, and may have a front window 32 of a transparent material such as glass. At the rear of the casing, may be provided a hub 33 or other tubular portion connected or merely open to a source of fluid, as air. At the end portion of said hub, a dust removing means or screen 34 may be provided.

Enclosed within the casing is a device 35 which is gyroscopically stabilized and is responsive to the earth's magnetic field. This device includes a gyro driven by air. A sleeve 36 is mounted in the hub 33 and in this sleeve is journalled at 37 a hollow shaft 38, the inner end thereof being adapted to snugly communicate with an opening 39 whereby air is transmitted to said shaft. Fixed on the shaft is a gimbal element 40 having alined hub portions upon which may be journalled at 41 a gimbal means or casing 42 having corresponding hub portions. The latter may include a lower section 43 in which a gyro 44 is mounted. Extending from the hollow shaft 38 is a passage 45 communicating with annular registering passages 46 in the hubs at one of the pivots 41, and a passage 47 may lead therefrom to a point or points where the air for driving the gyro 44 is supplied thereto, as hereinafter described.

The arrangement of the device 35 is preferably such as to render it universally movable and balanced in every direction. Within the casing or frame 43 the gyro is mounted to spin about a vertical axis 48 central with a device 35. A finger 49 may slidingly engage in an annular groove of the gyro for retaining the same on its shaft 48. The gyro is rotated by any suitable pressure fluid means, preferably air is utilized for this purpose. The invention contemplates the provision of a simple unitary means which will not only drive the rotor but also damp oscillations thereof. Preferably a pendulously controlled air stream is utilized arranged so as to affect the volume, direction or energy of the air stream. For example, a weight 50 is provided pendulously suspended by a suitable flexible preferably metallic corrugated tube or jet-pipe 51 communicating with the passage 47 and having an axial orifice 52.

The rotor 44 contains passages 53 which terminate at one end in individual intake openings 53a and at the other end in discharge orifices which are so arranged as to drive the rotor by impulse or reaction preferably at the periphery of the rotor. The discharge orifices are arranged at a distance from the gimbal axes or axes of tilt such as to exert a torque about these axes as a result of a discharge of unequal quantities of air from the orifices. In order to accomplish the damping, the inlet of each passage in the arrangement shown is advanced 180° from its outlet. If now an oscillation or a tilt of the gyro rotor occurs, the jet-pipe discharges more air or less into certain of the individual intake openings 53, thereby producing a torque about an axis normal to the axes of tilt, thus causing a processional movement of the gyroscope which will quickly damp the oscillation and correct the inclination.

When this is accomplished, the rotor is again in perfect alinement with the jet-pipe and air is discharged equally and in balanced relation to the different passages, causing a continuous and uniform rotation of the gyro.

Air can be supplied to the gyro under pressure or suction, or both, as by means of a Venturi tube 54a to which air is supplied in the direction of the arrow due to the travel of the aircraft, creating a suction through passage 54b which may be controlled by a screw type valve 54c, the suction being communicated through the passage 53, nozzle 52 and connected passages including 39.

Mounted in the casing 42 so as to be controlled by the gyroscope, is a means responsive to the earth's magnetic field, such as a magnetic north seeking element 55. Preferably a plurality of such elements may be parallely interconnected and mounted as a unit on a spindle 56 journalled at different points in the casing so that the axis of said element is in fixed alinement with the gyro. While the magnetic element can be disposed at different elevations, it is preferably arranged to lie in a plane determined by the horizontal axes of freedom at 38 and 41 of the gyroscope. In order accurately to indicate the direction or heading of an aircraft, an indicator or compass card 57 may be mounted on the spindle 56 so as to be controlled by the element 55. For the purpose of protecting the sensitive element 55 against magnetic disturbances that might be created by the rotating gyro, an insulating means 58 may be mounted between the compartments of the casings 42, 43 or wholly in the casing 42.

Sometimes there is a constant magnetic effect acting upon the element 55 from a certain part of the aircraft, which tends to deflect the element from its true position. To overcome this a suitable compensator 59 may be provided which may include a casing 60 mounted on casing 42 and having a plurality of concentric gears 61, 62 alined with the axis of element 55. These gears are independently rotatable by individual pinions 63, 64 which are separately controlled by members 65. Each of the gears 61, 62 carries one or more magnetic elements 66, 67 which are thus adapted to be set by adjustment at 65 so that the resultant of all magnetic forces is such as to cause the magnetic element 55 to correspond to a true north or other predetermined direction. In order to afford access to the compensator, the casing 31 may have a removable closure 68 such as a screw cap, whereby the members 65 can be adjusted.

The casing 42 may have an opening or window 69 through which the compass card is visible, the scale divisions thereof being read with respect to any suitable relatively stationary mark such as 70 which may be provided on the window 32. In order to show pitch and banking, suitable indications may be provided operating as between the gyroscope and a relatively stationary part. Thus the casing 42 may have an elongated straight line mark 71 at the base of window 69, associated with horizontally spaced marks 72 on window 32. It will be perceived that the marks 71, 72 are disposed substantially in the horizontal plane determined by the axes at 38 and 41 so that accurate reading is assured, and that, due to the proximity of the indicia on the compass card and at 70, 71, 72 easy and rapid observation is afforded, the arrangement being practically unitary in its nature for showing heat, pitch and banking of the aircraft. It may be noted that pitch is indicated by a vertical interrelative movement between marks 71, 72, while banking is shown by an interrelative angular movement as between the mark 71 and line determined by marks 72. Moreover, combined pitch and banking may likewise be observed by noting the relative position of marks 71, 72.

Obviously, the present invention is not restricted to the particular embodiments herein shown and described. Various other forms of instruments may be designed using with best advantage the invention herein shown and disclosed without, however, departing from the spirit of the present invention.

What is claimed is:

1. In a gyroscopic instrument, a gyro rotor having a plurality of air discharge driving orifices and individual passages communicating with said orifices; of means for supporting said rotor for spinning about a first and tilting about a second axis; and means responsive to tilt of said rotor for differentially supplying air to said individual passages in such tilt, whereby erecting torques are exerted on the gyroscope by unequal air reactions from the discharge orifices.

2. A gyroscope comprising in combination, a gyro rotor having a plurality of air discharge driving orifices and individual passages communicating with said orifices; a rotor bearing member supporting said rotor for spinning about an axis; means for supporting said member for tilting about an axis normal to the axis of spin; and means responsive to the tilt of said member for differentially supplying air into said individual passages in response to such tilt, whereby erecting torques are exerted on the gyroscope by unequal air reactions from the discharge orifices.

3. A gyroscope comprising in combination, a gyro rotor having a plurality of air discharge driving orifices and individual passages communicating with said orifices, said passages having air intake openings; a rotor bearing member supporting said rotor for spinning about an axis; means for supporting said member for tilting about an axis normal to the axis of spin; and air supply means associated with said intake openings for differentially supplying air into said individual passages in dependance on tilting movements of said member, whereby erecting torques are exerted on the gyroscope by unequal air reactions from the discharge orifices.

4. A gyroscope comprising in combination, a gyro rotor having a plurality of air discharge driving orifices and individual passages communicating with said orifices, said passages having air intake openings; a rotor bearing member supporting said rotor for spinning about an axis; means for supporting said member for tilting about an axis normal to the axis of spin; an air supply nozzle associated with said intake openings and movable relatively thereto in dependance on tilting movements of said member, whereby erecting torques are exerted on the gyroscope by unequal air reactions from the discharge orifices.

5. In a gyroscopic instrument, a gyro rotor having a plurality of air discharge driving orifices and individual passages communicating with said orifices; of means for supporting said rotor for spinning about a first and tilting about a second axis; and pendulum controlled means for differentially supplying air into said individual passages, whereby upon tilt of said rotor erecting torques are exerted on the gyroscope by unequal air reactions from the discharge orifices.

6. A gyroscope comprising in combination, a gyro rotor having a plurality of air discharge driving orifices and individual passages communicating with said orifices, said passages having air intake openings; a rotor bearing member supporting said rotor for spinning about an axis;

means for supporting said member for tilting about an axis normal to the axis of spin; air supply means associated with said intake openings adapted differentially to supply air into said individual passages in response to a control movement; and a pendulum connected to control said supply means, whereby erecting torques are exerted on said gyroscope by unequal air reactions from the discharge orifices.

7. A gyroscope comprising in combination, a gyro rotor having a plurality of air discharge driving orifices and individual passages communicating with said orifices, said passages having air intake openings; a rotor bearing member supporting said rotor for spinning about an axis; means for supporting said member for tilting about an axis normal to the axis of spin; a jet-pipe adapted to discharge air into said intake openings and movable relatively thereto; and a pendulum connected to control the movements of the jet-pipe relatively to said intake openings, whereby erecting torques are exerted on said gyroscope by unequal air reactions from the discharge orifices.

8. A gyroscope comprising in combination, a gyro rotor having a plurality of air discharge driving orifices and individual passages communicating with said orifices, said passages having intake openings; means for supporting said rotor for freedom to spin about a vertical axis and freedom to tilt about two axes at right angles to each other and to the axis of spin; and pendulum controlled means for equally and unequally supplying air into said openings in dependance on tilting movements of said rotor, whereby the rotor axis is maintained vertical by erecting torques exerted on the gyroscope by unequal air reactions from the discharge orifices.

9. A gyroscope comprising in combination, a gyro rotor having a plurality of air discharge driving orifices and individual passages communicating with said orifices, said passages having intake openings; means for supporting said rotor for freedom to spin about a vertical axis and freedom to tilt about two axes at right angles to each other and to the axis of spin; a jet-pipe adapted to discharge air into said intake openings and movable relatively thereto; and a pendulum connected to control the movements of the jet-pipe, whereby the rotor axis is maintained vertical by erecting torques exerted on the gyroscope by unequal air reactions from the discharge orifices.

10. A device including a gyroscope having a rotor provided with air passages for driving the rotor by reaction, said passages having inlets adjacent to the center of the rotor, and damping means for the gyroscope including a pendulously controlled nozzle movable relatively to the inlets for discharging different quantities of air into the different inlets when the gyro tilts.

11. A device including a gyroscope having a rotor provided with air passages for driving the rotor by reaction, said passages having inlets at the center of the rotor and outlets remote from said center, and pendulous means for controlling the flowing of air to said inlets.

12. A device including a gyroscope having an air driven rotor, and means for driving said rotor and damping oscillations thereof, said means including means for supplying a stream of air to the rotor for driving the same by reaction, and pendular means for varying the effectiveness of the air stream at points spaced from the center of the rotor for damping oscillations thereof.

13. A navigating device including a directive gyroscope having a rotor provided with a plurality of angularly spaced openings, means for discharging a fluid stream into said openings for driving the rotor, and pendular means responsive to changes in position for modifying the quantity of the discharge of fluid through the different openings to cause damping of the rotor oscillations away from the true directive position.

14. Damping means for a gyro vertical including a rotor having passageways terminating at the spin axis, said passageways opening through said rotor at points angularly and radially spaced about said axis to spin the rotor by reaction, and pendulous means movable relatively to said rotor axis for directing a jet of air into said passageways so that the amount of air instantaneously directed to the several passageways is varied when the spin axis tilts.

PAUL KOLLSMAN.